| United States Patent [19] | [11] Patent Number: 4,841,018 |
| --- | --- |
| Gaughan | [45] Date of Patent: Jun. 20, 1989 |

[54] CATALYTIC PREPARATION OF POLY(ARYLENE SULFIDE) FROM HALOTHIOPHENOL

[75] Inventor: Roger G. Gaughan, Bartlesville, Okla.

[73] Assignee: Phillips Petroleum Company, Bartlesville, Okla.

[21] Appl. No.: 96,220

[22] Filed: Sep. 8, 1987

Related U.S. Application Data

[63] Continuation of Ser. No. 664,734, Oct. 25, 1984, abandoned.

[51] Int. Cl.$^4$ .............................................. C08G 75/02
[52] U.S. Cl. .................... 528/374; 528/212; 528/213; 528/217; 528/375
[58] Field of Search ............... 528/374, 375, 212, 213, 528/217

[56] References Cited

U.S. PATENT DOCUMENTS

| 3,274,165 | 9/1966 | Lenz et al. | 528/374 |
| 3,780,000 | 12/1973 | Feasey et al. | 528/374 |
| 3,940,375 | 2/1976 | O'Shaughnessy et al. | 260/79.1 |

FOREIGN PATENT DOCUMENTS 58-836026 10/1983 Japan.
58-836027 10/1983 Japan.

OTHER PUBLICATIONS

English language translations of Japanese 83-836026/49 and Japanese 83-836027/49, both 10-29-83, supplied by applicants.

Campbell, J. Robert, "Synthesis of Thioethers. Amide Solvent-Promoted Nucleophilic Displacement of Halide by Thiolate Ion", *Journal of Organic Chemistry*, vol. 26, Jul. 1964, pp. 1830–1833.

High Temperature Polymer and Fluid Research, vol. 1, pp. 123, 139–146 (1962).

Burton, Use of Phenylmagnesium Bromide for Preparation of Phenyl Aryl Sulphides, Sulphoxides, and Sulphones, *J. Chem. Soc.*, 528 (1948).

Campbell, Reduction of Disulfides with Copper Preparation of some Thioethers, *J. Org. Chem.*, 27, 2207 (1962).

Wilson et al., Action of Aluminum Bromide on Some Halogenated Thiophenols and Benzyl Phenyl Sulfides, *J. Am. Chem. Soc.*, 72, 5200 (1950).

Truce et al., Cleavage of Sulfides and Sulfones by Alkali Metals in Liquid Amines, *J. Am. Chem. Soc.*, 82,2872 (1960).

Uhlenbroek, Preparation of Diaryl Sulphides, *Recl. Trav. Chim. Pays-Bas*, 80,1057 (1961).

Bunnett et al., Arylation of Arenethiolate Ions, *J. Org. Chem.*, 39, 3173 (1974).

Migita et al., Palladium Catalyzed Nucleophilic Substitution, *Bull. Chem. Soc. Jpn.*, 53, 1385 (1980).

*Primary Examiner*—Harold D. Anderson
*Attorney, Agent, or Firm*—Williams, Phillips & Umphlett

[57] ABSTRACT

A process for the catalytic self-condensation of halothiophenol to form a poly(arylene sulfide) is disclosed. The reaction mixture includes an alcohol solvent, the halothiophenol, an alkaline reagent and a catalyst comprising a Group VIII metal. The polymerization process can be carried out at pressures as low as 1 atmosphere and temperatures of 200° C. or less.

33 Claims, No Drawings

CATALYTIC PREPARATION OF POLY(ARYLENE SULFIDE) FROM HALOTHIOPHENOL

This application is a continuation of application Ser. No. 664,734, now abandoned.

BACKGROUND

This invention relates to poly(arylene sulfide)s. In one aspect, the invention relates to the preparation of poly(arylene sulfide)s in a low-temperature process from a halothiophenol starting material. In a further aspect, the invention relates to the preparation of poly(arylene sulfide)s using nickel or palladium catalysts.

The standard preparation of poly(arylene sulfide)s involves the reaction of a sodium source such as sodium sulfide and an aromatic compound such as p-dichlorobenzene, in a polar organic medium such as N-methylpyrrolidone. The reaction has the disadvantages of requiring high reaction temperature (280° C.) and pressure (260 psig). A further disadvantage is the cost of the rather expensive N-methylpyrrolidone medium. It would be desirable to produce poly(arylene sulfide)s in processes which would permit the use of low temperatures and pressures and less expensive reaction mediums.

It is therefore an object of the present invention to provide new methods for preparing poly(arylene sulfide)s. It is a further object to provide relatively low temperature and low pressure processes for preparing poly(arylene sulfide)s. It is a further object to provide a preparation process employing relatively low-cost reaction solvents.

SUMMARY OF THE INVENTION

According to the invention, poly(arylene sulfide)s are prepared by the catalyzed self-condensation of halothiophenols in an alcohol solvent. The reaction requires relatively low temperatures and pressures and is carried out in an alkaline medium. The preferred reaction is the reaction of p-bromothiophenol with a sodium reagent in an alcohol solvent using a divalent nickel or zero-valent palladium catalyst.

DETAILED DESCRIPTION OF THE INVENTION

The invention process employs a halothiophenol of formula XRSM, in which X is a halogen selected from fluorine, chlorine, bromine and iodine; R is a hydrocarbon radical selected from substituted and unsubstituted arylene having from 6 to about 20 carbon atoms; and M is hydrogen or an alkali metal selected from lithium, sodium, potassium, rubidium and cesium.

Halothiophenols according to the above formula include p-chlorothiophenol, p-bromothiophenol (1-bromo-4-mercaptobenzene), 1-bromo-2-methyl-4-mercaptobenzene, m-bromothiophenol, o-bromothiophenol, 1-fluoro-2-isopropyl-4-ethyl-5-mercaptobenzene, 1,3-dibromo-4-mercaptobenzene, 1-bromo-2-decyl-4-mercaptobenzene, 1-chloro-2-phenyl-4-mercaptobenzene, and 1-fluoro-4-mercaptonaphthalene. The preferred halothiophenol is p-bromothiophenol because of the reactivity of the bromide ion under the polymerization reaction conditions generally employed.

The invention polymerization process provides a method for the production of functionalized poly(arylene sulfide)s. As used herein, the term "functionalized" refers to polymers having pendent species containing heteroatoms; such polymers can be described in terms of polymeric units of the formula

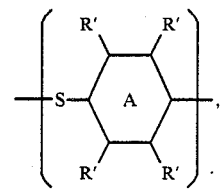

where each R' of each polymeric unit is selected independently from hydrogen and heteroatom-containing species such as, for example, $-NH_2$, $-COOH$, $-NHR$, $-CN$, $-OH$, $SO_2R$, $-SOR$ and $-SO_2H$, and A stands for aromatic units generally. A type of functionalization known as "end-capping" can be described with reference to terminal polymer units of the formula

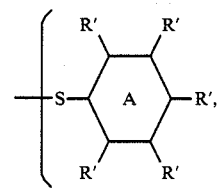

where R' is as defined above and at least one R' is not hydrogen. Such functionalized poly(arylene sulfide)s can be prepared by addition to the reaction mixture o a functionalized haloaromatic compound or, for end-capping, a minor amount of a functionalized monohaloaromatic compound containing the desired functional group, such as p-bromoaniline or p-bromobenzoic acid. The amount of the functionalized haloaromatic compound added to the reaction mixture will vary depending upon the haloaromatic used and the other reaction conditions, but will generally be about 1 to about 20 mole percent, preferably about 5 to about 15 mole percent, based on moles of the p-halothiophenol present.

Dihaloaromatic compounds of formula XRX, wherein R and X are as defined above and each X is selected independently, can be added in minor amounts to the reaction mixture to vary yield and polymer properties, if desired. Examples of such dihaloaromatic compounds are p-dichlorobenzene, m-dichlorobenzene, o-dibromobenzene, and p-dibromotoluene. Trihaloaromatic compounds such as 1,2,4-trichlorobenzene can be added as well to alter the properties of the final poly()arylene sulfide).

It was found that, under the polymerization conditions tested, th chlorine atom in p-chlorothiophenol is essentially unreactive for the condensation polymerization. The use of halothiophenols containing electron-withdrawing groups to enhance the activity of the chlorine atom is therefore within the scope of the invention. Such enhanced activity would be provided, for example, with halothiophenols having an ether group in the ortho position with respect to the chloride and a nitro group para to the chloride.

The self-condensation polymerization reaction is carried out in an alkaline medium, which can be produced in situ or by addition of an alkaline reagent to the reaction mixture. Suitable alkaline reagents include alkali metal hydroxides and carbonates. The preferred alkaline reagent is produced in situ by the addition of an elemental alkali metal such as metallic sodium to the reaction mixture or by the use of an alkali metal salt of the halothiophenol monomer employed.

A goal of the present invention process is the use of relatively inexpensive solvents or liquid reaction mediums for the polymerization reaction. The invention process will thus employ an alcohol solvent. Such alcohol solvents can include alkanols having from one to about 10 carbon atoms and di- or polyhydric alcohols having from 2 to about 20 carbon atoms. Examples of solvents within these classes include ethanol, propanol, butanol, propylene gycol and ethylene glycol. The solvent will be present in any amount effective for maintaining the reactants in solution. The preferred solvent for use with palladium catalysts is n-butanol and for ue with nickel catalysts is ethylene glycol.

The invention polymerization process employs a metallic catalyst comprising a metal of Group VIII of the Periodic Table. The preferred catalysts include complexes and salts of nickel, palladium and platinum. Preferred catalysts include zero-valent palladium, nickel or platinum complexes. Such complexes can be described by the formula $L_nM(O)$, wherein L can be described as $R_3P$ or $R_3N$ wherein each R is selected independently from hydrocarbyl moieties such as alkyl, aryl and cycloalkyl; and n is an integer from 1 to 4. Such complexes include, for example, tetrakis(triphenylphosphine)Pd(O), bis(bis(1,2-diphenylphosphino)benzenePd(O), and tetrakis(triphenylphosphine)Ni(O). Another preferred group of catalysts are divalent metal complexes of formula $L_nM(II)X_2$, where X is a halogen and n is 1 or 2. Such divalent metal complexes include bipyridylNiBr$_2$; bis(1,2-diphenylphosphine)benzeneNiBr$_2$ and bis(tri-n-butylphosphine)NiBr$_2$. When n is 1 or 2, L can be $R_3P_2$ or $R_3N_2$.

An additional class of catalysts suitable for the invention polymerization reaction includes salts of nickel, palladium and platinum. Examples of such salts are the metal halides such as, for example, $NiCl_2$ and $NiBr_2$.

The polymerization process involves contacting the halothiophenol, the solvent and the catalyst in an alkaline medium in amounts effective for the self-condensation of the halothiophenol to form poly(arylene sulfide). Preferably, the reaction mixture will contain a molar ratio of the alkaline reagent (such as sodium) to halothiophenol of at least about 1:1, more preferably at least 1.2:1.

The reaction will be carried out in a liquid solvent at a temperature of at least about 85° C., generally about 90° to about 250° C., preferably about 100° to about 225° C. Use of the palladium complexes generally permits reaction temperatures in the lower part of this temperature range, from about 85° C. to about 130° C., while use of nickel catalysts generally requires temperatures in the upper part of this temperature range, from about 150° C. to about 225° C. The reaction will generally be carried out under an inert atmosphere such as nitrogen at a pressure of from atmospheric to about 200 psig, preferably 0 psig to about 100 psig. The time for the reaction will vary widely depending upon other reaction conditions, but will generally fall within the range of about 1 hour to about 20 hours, preferably about 1 hour to about 5 hours.

A poly(phenylene sulfide) polymer prepared according to the invention process will generally be expected to have a inherent viscosity of about 0.02 to about 0.13. The polymer can be cured to a higher melt flow by, for example, curing in an oxygen-containing atmosphere. The poly(phenylene sulfide) has a glass transition temperature of about 85° C. and a melting temperature in the range of about 254° C. to about 285° C. The polymer has wide utility as a coating material, for injection molding, and in film and fiber applications.

EXAMPLE I

This example illustrates the preparation of polyphenylene sulfide (PPS) from p-bromothiophenol in the presence of zero-valent palladium catalysts. To a 150 mL resin flask equipped with a magnetic stirrer, a condenser, a thermometer and a nitrogen purge inlet were charged 80 mL of n-butanol and 3.0 grams (130.5 millimoles) of sodium metal. The sodium metal was allowed to react completely with the alcohol under a nitrogen atmosphere, without being heated. Then 9.45 grams (49.9 millimoles) of 95 weight percent p-bromothiophenol (p-BTP, Fairfield Chemical Company, Blythewood, SC) were added and allowed to dissolve with stirring. Thereafter, 0.23 grams (0.21 millimoles) of tetrakis(triphenylphosphine)palladium(O) (Alfa Products, Ventron Division, Morton Thiokol, Inc., Danvers, MA) were added, and the solution was heated at about 100° C. overnight with stirring.

Most of the formed PPS polymer precipitated from the polymerization solution during polymerization. In order to extract low molecular weight material, about 50 mL of methanol was added. The polymer slurry was filtered, and the filter cake was washed with 100 mL methanol and with 100 mL of hot distilled water. The polymer was then dried at about 100° C. (preferably in a nitrogen atmosphere). The yield of dry PPS was 3.39 grams, equivalent to 63% of the theoretical yield.

Several other runs employing the same reactants and catalyst were carried out with some slight variations, which did not appear to significantly affect yield and polymer properties. For instance, the amount of tetrakis(triphenylphosphine)Pd(O) catalyst was varied from 0.18 grams to about 0.74 grams; the temperature was varied from about 100° C. to about 130° C., the amount of butanol was varied from about 55 mL to about 80 mL, and the recovered polymer was washed with three 100 mL aliquots of hot distilled water and finally with 100 mL acetone. The polymer yields in these runs ranged from about 50% to about 93% of the theoretical yield.

One PPS polymer sample was characterized by differential scanning calorimetry (by means of a Perkin-Elmer DAC-2C, equipped with a computerized data system and a Perkin-Elmer TADS-1 plotter; at a heating rate of 20° C. per minute). Thermal transition points were: glass transition temperature (Tg): 85° C.; melting temperature (Tm): 260° C.

Another PPS sample was analyzed by IR spectrometry using a Perkin-Elmer 137 sodium chloride infrared spectrometer. Solid samples were run as KBr pellets with 1 weight prcent of PPS. Measured absorption peaks were at 3608, 3469, 3068, 1648, 1636, 1570, 1470, 1435, 1389, 1096, 1077, 1010, 818, 741 and 691 cm$^{-1}$.

The inherent viscosity (IV; measured at 206° C. on 0.4 weight percent solutions in 1-chloronaphthalene) of PPS samples prepared in accordance with the procedure of this example ranged from about 0.02 to about 0.09.

The polymer could be cured by heating in air. The extrusion rate (measured at 600° F. with an extrusion plastometer having a die orifice length of 0.125 inch and a die diameter of 0.0825 inch, and employing a driving weight of 360 grams) changed from an initial value of 1388 g/10 min to 0.3 g/10 min by heating the PPS sample at 507° C. for 6 hours. The cure rate was 1388/0.6=2313, thus the viscosity increased by a factor of 2313 by this curing operation.

EXAMPLE II

A second Pd(O) compound was employed in several runs as a catalyst for the self-condensation polymerization of p-bromothiophenol in accordance with the procedure described in Example I. The catalyst used was bis[bis(1,2-diphenylphosphino)benzene]palladium(O) (Strem Chemical Company, Newburyport, MA), applied in amounts ranging from 0.12 grams to 0.7 grams per 9.45 grams of p-BTP (95 weight percent). IV of one PPS sample prepared with p-BTP as the monomer was about 0.04. The polymer yield was about 39% of the theoretical yield.

In another run, 1.0 gram of p-bromobenzoic acid was charged as an additional monomer (with 9.45 grams of p-BTP). A polymer was formed at a yield of 61% of the theoretical yield. The inherent viscosity of the polymer could not be determined because the polymer could not be dissolved in chloronaphthalene. It is believed that the polymer was functionalized PPS with terminal carboxyl groups, as confirmed by infrared analysis.

In a third run, 1.0 grams of bromaniline was charged in addition to 9.45 grams of p-BTP. A functionalized polymer was formed at a yield of about 57% of the theoretical yield; the IV was 0.08. It is believed that PPS with terminal amino groups was formed, as confirmed by infrared analysis.

EXAMPLE III

In this example the preparation of PPS from haloaromatic compounds other than p-bromothiophenol, in the presence of zero-valent Pd catalysts, is described.

Meta-bromothiophenol (9.45 grams) was used in two polymerization runs in accordance with the procedure of Example I, with tetrakis(triphenylphosphine)Pd(O) as th catalyst and n-butanol as the solent. PPS polymer was formed at a yield of 38-76% of the theoretical yield.

Attempts to prepare PPS from o-bromothiophenol and sodium metal in n-butanol catalyzed by tetrakis(triphenylphosphine)palladium(O) were not successful. The formed polymeric material was soluble in methanol and could not be precipitated, and it was concluded that this material was not PPS.

A run employing 10 grams of p-diboromobenzene and 3.12 grams of sodium sulfide (in lieu of bromothiophenol), with bis[bis(1,2-diphenylphosphino)benzene]Pd(O) as the catalyst, did not yield any significant amount of polymer. The yield was less than 1% of the theoretical yield. Another run with p-diodobenzene and Na$_2$S was also unsuccessful. The formed material was soluble in acetone and apparently was not PPS.

A run with 7.23 grams of p-chlorothiophenol (in lieu of p-BTP), 3.0 grams of Na metal, 75 mL of ethylene glycol as the solvent, and tetrakis(triphenylphosphine)Pd(O) as the catalyst, at about 110°-135° C., was also not successful; the formed product was soluble in methanol.

Based on the above-described tests, it is believed that only p- and m-bromothiophenol and substituted derivatives thereof can be employed for the preparation of PPS in the presence of zero-valent Pd catalysts under the particular reaction conditions employed.

EXAMPLE IV

This example presents results of unsuccessful test runs employing palladium(II) compounds. Reagents, amounts and reaction conditions wre essentially the same as those described in Example I, except that different Pd compounds wre employed in lieu of tetrakis(triphenylphosphine)Pd(O). In one run 0.14 grams of palladium(II) acetate was employed, and the polymer yield was less than 1% of the theoretical yield. In another run 0.18 grams of palladium(II) acetylacetenate was used, and the polymer yield was less than 1% of the theoretical yield. And the same result was attained when 0.14 grams of bis(triphenylphosphine)palladium(II) chloride was employed, as well as when no Pd compound was used in the self-condensation polymerization of p-BTP.

These above-cited test results indicate that complexes of $Pd^{2+}$ were not effective as catalysts in the self-condensation polymerization of p-bromothiophenol with sodium metal in an alcohol under the reaction conditions employed.

EXAMPLE V

This example illustrates the preparation of PPS from p-bromothiophenol in the presence of nickel(II) halides.

To the polymerization apparatus described in Example I were charged 80 ml ethylene glycol and 3.0 grams of sodium metal. After the metal had completely reacted with ethylene glycol, 9.45 grams of p-BTP (95 weight percent) were dissolved in the mixture, and then 0.2 grams of $NiBr_2$ were added as a catalyst. The reaction mixture was heated to about 200° C. A precipitate of PPS formed after about 2 hours of stirring at 200° C. Methanol was added to the cooled reaction mixture, which had been stirred overnight at about 200° C. The precipitate was washed three times with hot distilled water, three times with methanol, and finally once with acetone. The PPS was dried in a vacuum oven at 100° C. The polymer yield was 3.74 grams, which was equivalent to about 69% of the theoretical yield. The inherent viscosity of the polymer was 0.05.

Several runs were made with about 0.2 grams of $NiCl_2.6H_2O$ as the catalyst. The amounts of reactants and solvent and the reaction conditions were essentially the same as in the above-described first run of Example V, except that the reaction temperature was about 195° C. The yield ranged from about 60% to about 86% of the theoretical yield. Polymer IV was about 0.05.

Attempts to prepare PPS from p-chlorothiophenol in the presence of $NiCl_2$ under the above reaction conditions failed. Small amounts of a black material were formed that most likely consisted of NiS and of low melting dichlorophenyl sulfides and disulfides. A test run with $FeCl_2$ in place of $NiCl_2$ did not produce any polymer from p-BTP and sodium in ethylene glycol.

EXAMPLE VI

This example illustrates the preparation of PPS from p-BTP in the presence of Ni(II) complexes. To the polymerization apparatus described in Example I were charged 80 mL of n-butanol and 3.0 grams of sodium metal. After the metal went into solution, 9.45 grams of 95 weight percent p-BTP were dissolved in the mixture. Then 0.22 grams (0.59 millimoles) of 2,2'-bipyridyl-Ni(II)Br$_2$ (prepared in accordance with the procedure described in Journal of American Chemical Society 93, 3350 (1971) were added. The reaction mixture was heated and stirred overnight at 120° C. PPS precipitated from the polymerization solution. The precipitate was washed once with methanol, three times with hot distilled water and finally with acetone. The PPS polymer yield was 1.21 grams (22% of theoretical yield). The inherent viscosity of the polymer was 0.04.

Another polymerization run was carried out with 80 mL ethylene glycol, 1.5 grams (65.2 millimoles) of sodium metal, 12.33 grams (65.2 millimoles) of p-BTP and 0.13 grams (0.19 millimoles) of bis(1,2-diphenylphosphino)benzeneNi(II)Br$_2$ (Strem Chemical Company). The reaction temperature was about 190° C. The IV of the formed PPS polymer was 0.04; the polymer yield was about 64% of the theoretical yield. A run at about 100°–120° C. in butanol employing bis(1,2-diphenylphosphino)benzeneNiBr$_2$ did not produce a polymer insoluble in methanol. Thus it is believed that a reaction temperature of at least about 180° C. is necessary when this nickel catalyst is employed.

In a further experiment, 3.11 grams of sodium metal were dissolved in about 100 mL of ethylene glycol. Then 15 grams of p-BTP were added, and the yellow solution was refluxed for 3 hours. A second aliquot of 15 grams of p-BTP was dissolved in the above mixture. Then 1.0 gram of bis(tri-n-butylphosphine) nickel (II) bromide (prepared in accordance with the procedure described in Actra Chimica Scandinavia 17, 1115–1125, 1963, K. Jensen et al.) were added. The mixture was refluxed for about 2½ hours. A dark oil separated as the bottom layer, which solidified upon cooling overnight. The supernatant solution became gelatinous upon cooling and was poured into 100 mL of methanol. A light brown solid was filtered off, washed with water and air-dried. The polymer yield was 0.65 grams (about 2% of the theoretical yield). The formed oil (18.2 g) appeared to be 4,4'-dibromodiphenyl sulfide. Thus bis(tri-n-butylphosphine)NiBr$_2$ is not considered a preferred catalyst for preparing PPS under the conditions described above.

A test employing p-chlorothiophenol and bis(tri-n-butylphospine)NiCl$_2$ catalyst did not produce any noticeable amount of polymer.

EXAMPLE VII

This example illustrates the preparation of PPS from p-bromothiophenol in the presence of Ni(O) complexes as catalysts. 2.56 grams (111 millimoles) of sodium were dissolved in about 100 mL of ethylene glycol in a 3-neck flask fitted with a condenser and argon inlet. Then 10.6 grams (56 millimoles) of p-BTP were added and stirred for about 1 hour before 1.7 grams (1.5 millimoles) of tetrakis(triphenylphosphine)nickel(O) (prepared in accordance with the procedure described in Inorganic Syntheses, Volume XIII, pages 124–126, 1972) were added. The mixture was heated to reflux (about 200° C.) for about 2 hours. After cooling overnight, a yellow precipitate formed. The mixture was poured into 100 mL of methanol, and the solid was washed with water and dried. The yield of the formed polymer, which melted at about 245° C., was 4.28 grams (70% of the theoretical yield).

I claim:

1. A process for the preparation of a poly(arylene) sulfide comprising:
    contacting, in an alkaline reaction medium, a halothiophenol and a catalyst comprising a compound selected from the group consisting of palladium complex compounds in which the palladium has a valence state of zero, nickel complex compounds in which the nickel has a valence state of zero or two, and nickel halides in which the nickel has a valence state of two, in an alcohol solvent under polymerization conditions effective for producing the poly(arylene sulfide); and,
    recovering the poly(arylene sulfide).

2. The process of claim 1 in which the halothiophenol comprises a p-haothiophenol or a m-halothiophenol.

3. The process of claim 1 in which the reaction conditions include a temperature of from about 85° C. to about 250° C. and a pressure of from about 0 psig to about 200 psig.

4. The process of claim 1 in which the alcohol solvent is selected from alkanols having from 1 to about 10 carbon atoms.

5. The process of claim 4 in which the alcohol slvent comprises an ethanol, a propanol or a butanol.

6. The process of claim 1 in which the alcohol solvent is a dihydric alcohol.

7. The process of claim 6 in which the alcohol solvent comprises an ethylene glycol or a propylene glycol.

8. The process of claim 1 in which the alkaline reaction medium comprises an alkali or alkaline earth metal.

9. the process of claim 1 in which the catalyst is present in an amount of from about 0.01 to about 1 mole percent, based on moles of halothiophenol.

10. The process of claim 8 in which the catalyst is present in an amount of about 0.1 to about 0.5 mole percent.

11. The process of claim 1 in which the recovered poly(arylene sulfide) has an inherent viscosity, measured at 206° C. on 0.4 weight percent solutions in 1-chloro napthalene, of from about 0.02 to about 0.13.

12. The process of claim 1 which further comprises the step of heating the recovered poly(arylene sulfide) in an oxygen-containing atmosphere to produce a cured poly(arylene sulfide).

13. The process of claim 11 in which the cured poly(arylene sulfide) has a melt flow within the range of about 30 to about 500.

14. The process of claim 1 in which the reaction mixture further contains a functionalized haloaromatic compound in which the functional group comprises —NH$_2$, —COOH, —NHR, —CN, —OH, —SO$_2$R or SO$_3$H.

15. The process of claim 13 in which the functionalized haloaromatic compound is selected from the group consisting of haloanilines and halobenzoic acids.

16. The process of claim 1 in which the polymerization conditions include a time of from about 1 hour to about 20 hours.

17. The process of claim 1 in which the catalyst comprises a palladium complex compound in which the palladium has a valence state of zero.

18. The process of claim 17 in which the catalyst comprises a palladium complex compound selected from the group consisting of tetrakis(triphenylphosphine)Pd and bis(bis(1,2-diphenylphosphino)benzenePd.

19. The process of claim 18 in which the catalyst comprises tetrakis(triphenylphosphine)Pd.

20. The process of claim 19 in which the halothiophenol comprises a p-halothiophenol or a m-halothiophenol.

21. The process of claim 18 in which the catalyst comprises bis(bis(1,2-diphenylphosphino)benzenePd.

22. The process of claim 21 in which the halothiophenol comprises a p-halothiophenol or a m-halothiophenol.

23. The process of claim 1 in which the catalyst comprises a nickel complex compound in which the nickel has a valence state of zero or two.

24. The process of claim 23 in which the catalyst comprises a nickel complex compound selected from the group consisting of bipyridylNiBr$_2$; tetrakis(triphenylphosphine)Ni; bis(tri-n-butylphosphine)NiBr$_2$; and bis(1,2-diphenylphosphino)benzeneNiBr$_2$.

25. The process of claim 24 in which the halothiophenol comprises a p-halothiophenol or a m-halothiophenol.

26. The process of claim 24 in which th catalyst comprises bipyridylNiBr$_2$.

27. The process of claim 24 in which the catalyst comprises tetrakis(triphenylphosphine)Ni.

28. The process of claim 24 in which the catalyst comprises bis(tri-n-butylphosphine)NiBr$_2$.

29. The process of claim 24 in which the catalyst comprises bis(1,2-diphenylphosphino)benzeneNiBr$_2$.

30. The process of claim 1 in which the catalyst comprises a nickel halide in which the nickel has a valence state of two.

31. The process of claim 29 in which the catalyst comprises a nickel halide selected from the group consisting of NiBr$_2$ and NiCl$_2$.

32. The process of claim 30 in which the halothiophenol comprises a p-halothiophenol or a m-halothiophenol.

33. A process for the preparation of poly(phenylene sulfide) comprising:

contacting, in an alcohol solvent: (1) a halothiophenol selected from the group consisting of p-bromothiophenol and m-bromothiophenol; (2) sodium, present in an amount of about 1 to about 5 moles per mole of said halothiophenol; and, (3) a catalyst selected from the group consisting of tetrakis(triphenylphosphine)Pd, bis(bis(1,2-diphenylphosphino)benzenePd, bipyridylNiBr$_2$, tetrakis(triphenylphosphine)Ni, bis(tri-n-butylphosphine)-NiBr$_2$, bis(1,2-diphenylphosphino)benzeneNiBr$_2$, NiBr$_2$, and NiCl$_2$, which is present in an amount of about 0.01 to about 1.0 moles per mole of said halothiophenol; under a nitrogen atmosphere at a pressure of about 0 to about 100 psig, at a temperature of about 85° C. to about 200° C., and for a time of about 2 hours to about 5 hours; and, recovering poly(phenylene sulfide) having an inherent viscosity, measured at 206° C. on 0.4 weight percent solutions in 1-chloronaphthalene, of about 0.02 to about 0.13.

* * * * *